March 8, 1938.  W. A. MORTON  2,110,736
GLASS MELTING FURNACE
Filed April 19, 1934  2 Sheets-Sheet 1
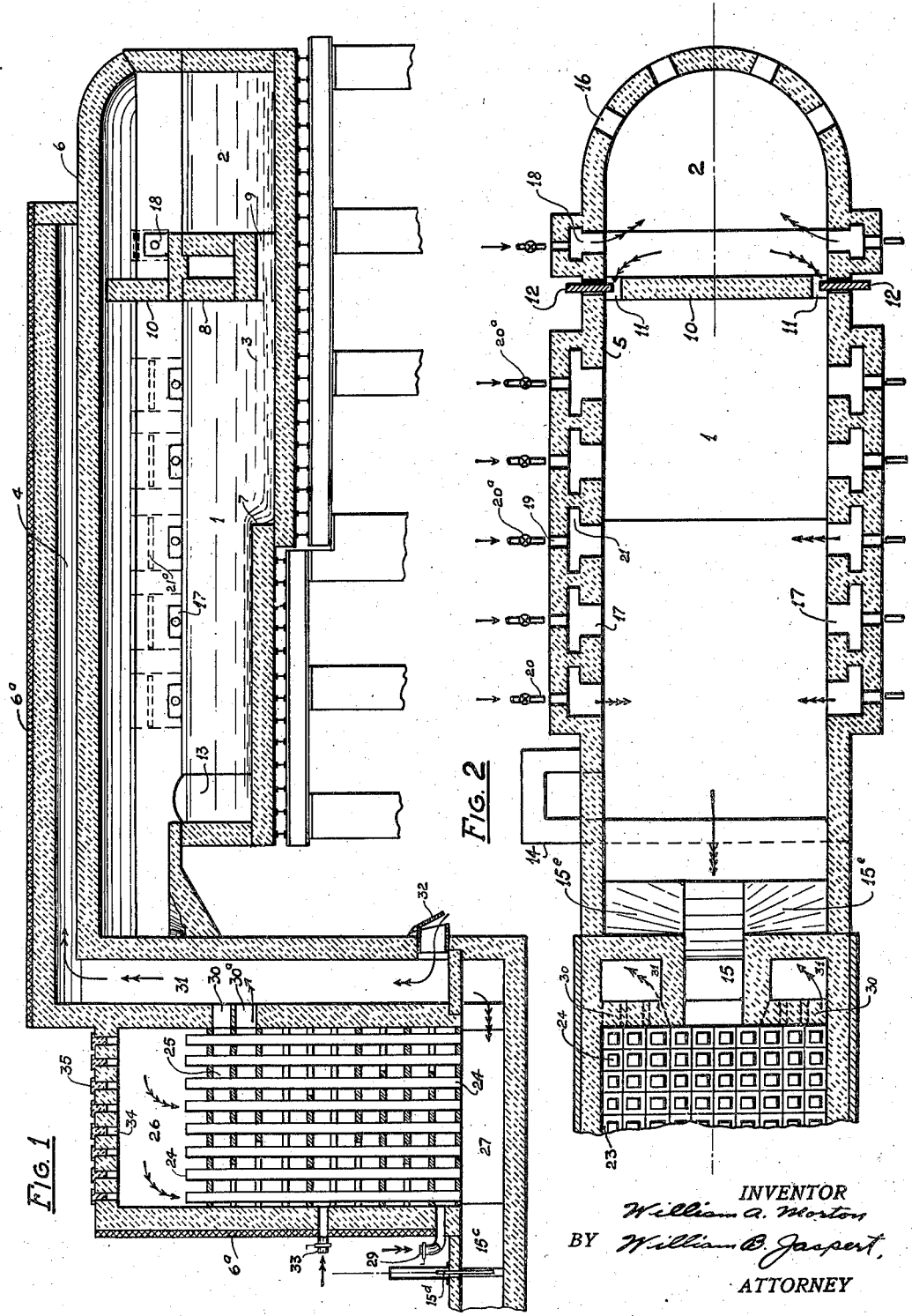

March 8, 1938. W. A. MORTON 2,110,736
GLASS MELTING FURNACE
Filed April 19, 1934 2 Sheets-Sheet 2
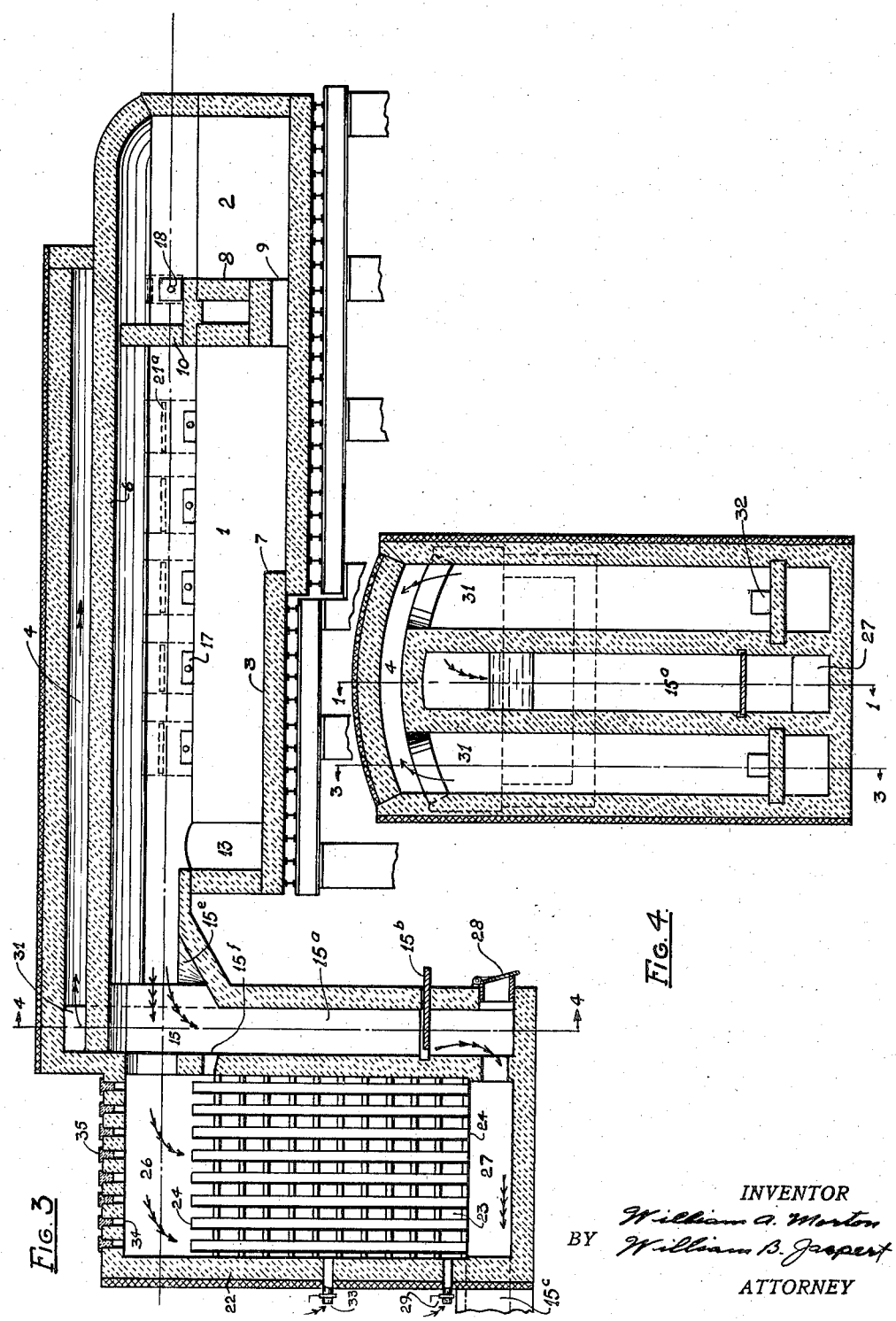
INVENTOR
William A. Morton
BY William B. Jaspert
ATTORNEY Patented Mar. 8, 1938

2,110,736

UNITED STATES PATENT OFFICE 2,110,736

GLASS MELTING FURNACE

William A. Morton, Pittsburgh, Pa., assignor to Amco, Incorporated, Pittsburgh, Pa., a corporation of Pennsylvania Application April 19, 1934, Serial No. 721,276

2 Claims. (Cl. 263—15)

This invention relates to new and useful improvements in industrial heating and melting furnaces more particularly to furnaces of the recuperative type, the herein disclosed embodiment featuring the invention as applied to glass melting furnaces, and it is among the objects thereof to provide a combined melting and working tank having a common hearth structure for the continuous melting and refining of glass in which the hearth shall be adapted to set up mechanical movement of the heavy viscous body of glass in the bottom of the furnace and towards the working end of the tank to thereby control the quality of the glass and obtain maximum production capacity of the melting chamber.

A further object of the invention is the provision of a furnace construction in which the melting efficiency of the side fired port furnace is enhanced by continuous controlled spaced firing from opposite sides and is combined with the economy of the compact end fired recuperator type furnace.

A further object of the invention is the provision of a recuperator structure for preheating the air to support combustion in the firing ports which shall be provided with auxiliary air and waste gas passages for producing and maintaining predetermined preheat temperatures for either rich or lean gases, and which auxiliary passages may also be employed for maintaining proper preheat conditions in the melting furnace at times when it is necessary to clean or repair the recuperator tile.

Still another object of the invention is the employment of a double roof to form a space therebetween through which preheated air is passed for further heating, to the burners and by means of which the temperature of the furnace roof is lowered by the relative cooling effect of the heated air sufficiently to permit efficient insulation of said roof, thereby effecting a very substantial reduction in heat loss by radiation. This is accomplished without lowering the temperature within the furnace. Such insulation is not possible on other designs of furnaces in which extremely high temperatures approach the refractory limit of the furnace brick or walls.

These and other objects of the invention will become more apparent from a consideration of the accompanying drawings constituting a part hereof in which like reference characters designate like parts and in which:

Figure 1 is a vertical cross-sectional view taken longitudinally along the center line 1—1, Figure 4, showing a glass melting furnace and recuperator structure embodying the principles of this invention;

Figure 2 a horizontal cross-sectional view thereof with a portion of the recuperator structure cut away;

Figure 3 a vertical cross-sectional view taken along the line 3—3, Figure 4; and Figure 4 a transverse vertical section taken along the line 4—4, Figure 3.

With reference to Figures 1 to 4 inclusive of the drawings, the reference numeral 1 generally designates the melting chamber of the furnace; 2, the working chamber of the furnace, said chambers having a common hearth 3 and a common preheated air passage 4 together with common side and top walls 5 and 6 respectively. The hearth 3 is interrupted by a shoulder 7 shown as substantially mid-way of the longitudinal dimension of the melting chamber 1.

A bridge wall 8 divides the melting and working chambers 1 and 2, the wall having a throat 9 at the bottom thereof and an extension 10 at the top, the extension being provided with side openings 11 controllable by dampers 12.

The melting chamber 1 is provided with an opening 13 through which batch material is fed from a dog house 14 and is further provided with a waste gas passage 15 leading to a recuperator structure, past a slag pit or drain 15e, and the working chamber 2 is provided with openings 16 from which glass is withdrawn for use in ware forming machines or the like.

A series of firing ports 17 are provided along the side walls 5 of the melting chamber, and a firing port 18 having the same source of preheated air is provided on each side wall of the working chamber adjacent the extension wall 10 to control temperature of working end.

The firing ports 17 may be staggered on opposite sides to provide a relatively continuous sheet of flame across the chamber 1 and the ports are separated from each other by sections of heavy walls, the outer wall and roof being likewise provided with insulation 6a to reduce radiation losses. Burner ports 19 are provided through which fuel is projected from adjustable burners 20 into the firing ports 17 and enlarged passages 21 connect the individual ports to the preheated air passage 4 above the furnace chamber so that an adequate supply of preheated air is available at the side fired ports.

The double crown with the air preheat space 4 therebetween reduces radiation losses in that the preheated air, although highly heated, circulating in the space 4, lowers the temperature of the upper crown sufficiently by relative temperature difference to permit the application of the heat insulating material 6a. Such insulation will effect a very substantial reduction in fuel consumption.

With reference to Figures 3 and 4 of the drawings, waste gas passages 15 at the rear of the melting chamber 1 communicates with a vertical passage 15a, this passage being controllable by a damper 15b to regulate the waste gases passing downwardly to a stack 15c which is also provided with a damper 15d. A recuperator generally designated by reference numeral 22 is provided with a tile structure built up of tile units 23 which, when assembled, form a series of vertical passages 24 and horizontal passages 25, Figure 1. The outer wall of recuperator 22 is also provided with insulation 6a. Tile units 24 communicate at the top and bottom with chambers 26 and 27, chamber 26 communicating with the waste gas passages 15 and 15a and the bottom chamber 27 communicating with the stack 15c. The tile 24 projects a considerable distance above the upper horizontal tile to prevent clogging of the vertical waste gas passages as any solids accumulating on the upper layer of tile will drain into the passage 15a through opening 15f. A clean-out door 28 is provided adjacent passage 15a to remove any accumulation from the bottom chamber 27.

The horizontal air passage 25 of the recuperator structure are open at 29 to the atmosphere and at their upper ends are provided with openings 30 and 30a leading to vertical air passages 31 which communicate at the top with the preheated air space 4 above the roof or crown 6 of the furnace chamber. Air passages 31 are provided with covered openings 32 at the bottom to provide auxiliary air when needed. Also, as shown in Figure 1, an auxiliary port or opening 33 is provided substantially midway of the continuous horizontal air passage for a purpose to be hereinafter explained.

Clean-out openings 34 are provided in register with the vertical waste gas passages 24 of the recuperator structure, these openings constituting poke holes which are closed by refractory plugs 35 that are removable when it is necessary to extend a bar or poker into the passages 24 for cleaning-out purposes.

The circulation of air and gases is illustrated by arrows in the drawings as follows: One arrow designates fuel gas, two arrows air, three arrows combustible mixture of air and gas, and four arrows the products of combustion or waste gases.

The operation of the above described apparatus is briefly as follows.

Material is fed through the opening 13 from the dog house 14 on the side at the rear of the melting chamber, and gaseous fuel is supplied by burners 20 on the side of the furnace. The pool of glass supported on the hearth 3 is maintained at substantially the level of the firing ports 17 with the lighter materials at the top surface of the pool and the plained or refined glass, which is of a high viscosity, settling to the bottom of the pool on the hearth 3 from which they pass through the throat 9 below bridge wall 8 into the working chamber 2.

By individual regulation of the burners 20 and the air supply dampers 21a, any desired melting temperature can be established longitudinally of the melting chamber, and by regulation of the burners in the firing ports 18 of the working chamber, the glass in the working end of the tank can be maintained at suitable working temperatures independently of the temperature in the melting chamber. To this end, dampers 12 can be regulated to utilize the heat of the melting chamber for maintaining the glass in the working chamber at proper thermal conditions without utilizing the burner ports 18, or this damper regulated heat may be employed in conjunction with the heat in the firing ports 18.

On account of the very high viscosity and specific weight of the plained glass adjacent the hearth 3 at the bottom of the glass pool, a definite mechanical longitudinal movement of the glass will be set up in the direction of withdrawal of the glass in the working tank 2, the glass passing through the throat of the bridge wall 8. The step or shoulder 7 of the hearth will assist by adhesion in drawing the bottom viscous glass by displacement and gravity from the rear of the melting chamber and cause it to move forward towards the throat 9 of the bridge wall; this tends to create and control a desirable movement of the heaviest glass along the collecting chamber toward the throat, thus assuring that the glass passing through the throat 9 is of uniform specific gravity and free of cord, striae and seed which results in conventional structures where undesirable convection currents form in the pool. In other words, construction of the hearth is stepped entirely across and of sufficient magnitude to move the heavy viscous glass by gravity at the bottom of the pool and prevent the surface glass from passing downwardly to the throat 9. Since the glass is withdrawn from the bottom of the pool, a mechanical current is created along the floor of the hearth by the glass flowing over the step. This automatically causes the surface glass in the pool to flow in the opposite direction by displacement. The throat 9, being below the step, can be enlarged in size to assure that the more viscous bottom glass will flow through same to the working chamber in lieu of the less viscous and unrefined glass near the surface, which would be the tendency with a smaller throat. The allowable velocity of movement through the throat of a normal deep pool type melting furnace is 3" per minute. If higher velocities are employed, less viscous glass is drawn through from higher levels where the glass is less highly refined.

Instead of the shoulder 7, the rear portion of the hearth may be inclined to produce a forward flow of the bottom glass, although such movement is mainly effected by the tenacity of the viscous glass which, in dropping over the dam or shoulder 7, exerts a definite pull on all of the glass lying on the bottom of the hearth towards the rear of the melting chamber, while the withdrawal of the glass from the working chamber 2 causes a similar pull by displacement on the bottom viscous glass flowing over the wier or step.

Air to support combustion in the firing ports 17 is supplied through the wide vertical passages 21 adjacent the firing ports to which it passes from the horizontal space 4 above the crown 6 of the furnace. The vertical air passages 21 are separately controlled by dampers 21a to regulate a neutral oxidizing or reducing flame from the individual ports. Air passing to the space 4 is preheated in the recuperator 22 in the following manner. The waste gases leave the melting chamber 1 through the rear passage 15 into the upper chamber 26 of the recuperator structure in which it accumulates and then passes downwardly through the vertical tile passages 24 to the bottom chamber 27 from which it passes to the stack 15c. The velocity of the waste gas passing to the stack is dependent, of course, upon the temperature of the gases generated in the melting chamber, and to provide for uniform preheat, damper 15d of the stack may be adjusted to maintain a constant velocity of the gases through the recuperator tile passages 24. Air is drawn or forced under pressure through openings 29 at the bottom of the recuperator wall into the lower horizontal air passage from which it is conducted back and forth through successive vertically spaced horizontally disposed air passages upward through the recuperator tile then through passages 30 and 30a into the passages 31 from which it passes into the space 4 communicating with firing ports 17.

If the recuperator waste gas passages become clogged and excess pressure develops in the upper chamber 26, this pressure can be relieved by opening damper 15b of the waste gas passage 15a to permit a quantity of the waste gases to pass downwardly to the lower chamber 27 and thence to the stack 15c, or if the recuperator is shut down for repairs damper 15b can be opened wide and all of the waste gases by-passed through the vertical passage 15a to the stack 15c, thus permitting operation of the furnace without the recuperator, which may be repaired and restored to service.

Under these conditions, air is supplied by opening the cover 32 of the air duct 31 to permit the air to pass directly to the space 4 and thence to the firing port without taking the tortuous passage of the recuperator tile, the air being preheated sufficiently to obtain necessary flame temperatures in its passage between the two arches 6 and 6a.

These auxiliary waste gas and air passages possess additional utility as follows: When the vertical waste gas passages 24 of the recuperator tile accumulate solids such as fluxes that may be entrained in the waste gases leaving the melting chamber, air can be temporarily drawn through the vertical passages 31 by opening covers 32 so that the recuperator tile becomes sufficiently hot to melt the solids in the waste gas passage and cause them to drip into the lower chamber 27 from which they are removed through the door 28, and when this melting-out process is completed, air will again be drawn through the openings 29 and the door 32 may be closed. The preheat can also be controlled by shutting off the openings 29 at the bottom of the recuperator and causing the air or any desired portion to enter through opening 33 whereby it has optionally a shorter path to travel to the openings 30 and 30a.

The auxiliary air and waste gas passages of the recuperator and tank are further designed to produce a given preheated air temperature to attain desired furnace temperatures when fuels of different quality are used. For example, a natural gas which is rich in fuel quality requires a theoretical volume of 10.126 cu. ft. of air plus gas for a unit of fuel burned. In this case, with a given preheated air temperature, approximately 9.1 cu. ft. of cold air per cu. ft. of gas must be preheated to attain a desired furnace temperature.

If a leaner fuel such as producer gas at 1000° F. which contains sensible heat is used to obtain the same temperature in the same furnace, the theoretical volume of air plus gas for the required fuel unit is substantially greater and less air is required to be preheated to obtain the desired furnace temperature. Consequently, where lean fuel is employed, less recuperator tile heating surface is required than where rich fuel such as natural gas is employed.

A lean fuel, such as producer gas, for example, produces about 25% more waste gases than that produced when natural gas is consumed with the same temperature developed in the furnace. I have found that 900° F. is about the greatest practical temperature difference allowable in the recuperator between the air and waste gases if rupturing stresses are to be avoided in the tile, and as the final waste temperature for natural gas may be about 700° F. under forced production and under the same furnace conditions, 1300° F. for producer gas, the permissible temperature difference allowable in the tile is exceeded and some of the waste gases must be by-passed to reduce the temperature difference to the allowable limit. By utilizing the damper 15b in the waste gas passage 15a, some of the excess waste gases can be by-passed around the recuperator to maintain the normal temperature difference in the tile of the recuperator 22.

By the employment of the recuperator at the rear of the furnace to draw-off the waste gases at one end of the melting chamber, a high preheat of air to support combustion can be maintained by the controls described above, and by employing the side port burners each of which is separately regulable, efficient heat distribution is obtained in the melting chamber.

Although one embodiment of the invention has been herein illustrated and described, it will be obvious to those skilled in the art that various modifications may be made in the details of construction without departing from the principles herein set forth.

I claim:

1. In a two compartment furnace, a heat exchanger, an air duct from the exchanger common to both compartments of the furnace, burners for each compartment means for controlling the amount of air delivered to the burners in the two compartments and means to separately control the flow of products of combustion leaving the two compartments.

2. In a two compartment furnace, a single heat exchanger for the furnace, an air duct communicating with the exchanger and by spaced passages to each compartment, a waste gas outlet for one compartment, a waste gas outlet for the other compartment communicating with the first compartment, and damper means to regulate the flow of waste gas between the compartments.

WILLIAM A. MORTON.